United States Patent [19]

Munk

[11] Patent Number: 5,465,471
[45] Date of Patent: Nov. 14, 1995

[54] APPARATUS FOR MACHINING BARS

[75] Inventor: Joachim Munk, Aichhalden, Germany

[73] Assignee: Thyssen Nordseewerke GmbH, Germany

[21] Appl. No.: 771,343

[22] Filed: Oct. 4, 1991

[30] Foreign Application Priority Data

Oct. 8, 1990 [DE] Germany .......... 40 31 911.3

[51] Int. Cl.⁶ ................................ B23B 39/16
[52] U.S. Cl. ................................ 29/563
[58] Field of Search ............ 29/33 P, 563, 29/33 D, 33 T; 82/47, 48, 101, 113, 124; 269/310; 72/405; 408/44, 45; 409/199, 163, 138; 414/224

[56] References Cited

U.S. PATENT DOCUMENTS

| | | | |
|---|---|---|---|
| 2,623,570 | 12/1952 | Resser | 279/2.11 X |
| 3,173,318 | 3/1965 | Lindemann | 82/47 |
| 3,182,816 | 5/1965 | Illo . | |
| 3,302,108 | 9/1967 | Lorenz | 409/163 X |
| 4,425,062 | 1/1984 | Kawamura et al. | 29/33 T X |

FOREIGN PATENT DOCUMENTS

| | | |
|---|---|---|
| 822103 | 12/1937 | France . |
| 1241925 | 8/1960 | France . |
| 625218 | 1/1936 | Germany . |
| 2448545 | 4/1976 | Germany . |
| 561576 | 5/1975 | Switzerland . |

*Primary Examiner*—Z. R. Bilinsky
*Attorney, Agent, or Firm*—Bachman & LaPointe

[57] ABSTRACT

An apparatus for machining an end of bar stock includes a mechanism for positioning the bar stock along a longitudinal axis so that the end of the bar stock is positioned at a desired location with respect to a cutting tool. The mechanism for positioning the bar stock is capable of moving in a first direction parallel to the longitudinal axis, a second direction perpendicular to and above and below the longitudinal axis and a third direction which is perpendicular to the first and second directions.

11 Claims, 6 Drawing Sheets

APPARATUS FOR MACHINING BARS

BACKGROUND OF THE INVENTION

For many applications bar material, including not only round but also polygonal bars, has to be machined. It is for example necessary to cut bar material to predetermined lengths. A particular problem arises however in the machining of the ends of bars. This includes mainly facing, internal and external beveling, hollowing, form drilling, corner rounding, external cylindrical turning, pointing, flat punching, crowning, and so on. All these machining operations require a metalworking device, generally consisting of a drill stand or the like.

The bar is then clamped in a vise and the end of the bar is worked by hand with the aid of the drill stand.

Another possible way of machining ends of bars comprises appropriate hollowing in a lathe or the like. This shows that the machining of bar ends is very labour-intensive, not highly automated and therefore very expensive.

The aim of the inventor is to develop an apparatus of the kind indicated above, by means of which the machining of bars, particularly the ends of bars, can be carried out automatically, at lower cost, and in particular also with much greater accuracy.

SUMMARY OF THE INVENTION

The foregoing problem is solved by the machining device being disposed on a slide and adapted to travel in the direction towards the end of a bar.

For this purpose the bar will generally be disposed horizontally and accordingly a tool will also be disposed horizontally on a machining device. For the slide automatic control is envisaged, NC or CNC control being very generally utilizable.

The slide should preferably be in the form of a cross slide or be mounted on a slide table, and the machining device should also be adapted to travel in a direction at right angles to the direction of feed of the slide.

Finally, it is also envisaged to raise the machining device, so that three-dimensional adjustment of the machining device and the machining of a portion of bar on all sides will be possible. For example, transverse bores can thus be made in the bar portions.

The present invention is based on the building block principle. The basic element is the machining device just described, for machining a bar or bar portion from one end. In a further developed embodiment, however, the machining of a bar portion at both ends is also envisaged. For this purpose, however, the machining should then be carried out separately by a device, described further on, for cutting to length. The bar portion is then machined from both ends in this separate machining station, in which case two machining devices, usually of identical or similar construction, are provided.

For the purpose of machining from both ends, or also from only one end, the bars or bar portions are held in vises. In the aforesaid separate machining station two such vises are provided. In order to be able to take into account different lengths of bar portions, these vises should be made displaceable relative to one another. For the sake of simplicity they are for this purpose disposed on appropriate guide columns which are disposed parallel and along which said vises can be moved.

In this development it is possible for the machining device also to be disposed on these guide columns, so that additional elements are not required and space is also saved. The invention is however also intended to include the separate arrangement.

If the end machining station is situated next to the cutting-to-length station, the bar portions cut to length must be transferred from the cutting-to-length station to the end machining station. This is preferably done with the aid of automatically operable grippers disposed between the two stations. For the sake of simplicity, after gripping the bar portion these grippers are turned about an axis and then lay the bar portions in the vises.

If the bar portion is cut to length and one end is machined in a single station, one vise is sufficient. A positioning pin is then provided for said vise. By means of this positioning pin the end of the bar is accurately positioned, so that the machining can be effected with substantially greater accuracy.

When the cutting-to-length station and the end machining station are combined, the positioning pin is preferably situated on the slide on which the machining devices are also situated. A plurality of machining devices are then preferably disposed on the slide, in which case a plurality of machining combinations are possible without the tool having to be changed. With the cross slide according to the invention this is achieved in a simple manner.

If the cutting-to-length station and the end machining station are separate, an indexing unit, which in turn is slidable on guide rods, is preferably situated in the cutting-to-length station. This indexing unit then has associated with it a vise which is likewise once again situated on the same guide rods, so that its position can also be varied.

In all cases a sawing unit is situated in the cutting-to-length station. By means of this sawing unit a bar end can be cut through smoothly, so that here again more accurate machining is achieved. According to the invention the saw unit is in the present case connected to a lifting device, which moves the sawing unit approximately vertically downwards. During sawing the forces thus act almost vertically on the bar material, so that the cut is made more cleanly and with less chatter. The lifting devices and the vise will probably be driven hydraulically, while the sawing unit and the machining device will operate with the aid of servomotors.

The slide is preferably mounted on a machine table, all open spaces both in the slide and in the machine table being covered by bellows. These bellows protect against dirt and chips and also against coolant used to cool the tool during the machining of the ends.

In a particularly preferred example of embodiment of the invention the slide, the machining device and optionally also the vise and the sawing unit are situated in a closed casing and can be operated automatically from a control desk. The entire operating space is then covered by an electrically protected cabin, with lighting and with good visibility through a large window. Electronic control with great flexibility and simple programming controls all machine functions. An integral memory is generously dimensioned for various work programs. A wide range of machining operations, such as sawing, whirling, face milling, chamfering, drilling, etc., can be carried as desired out with this apparatus. In particular, whirling with end machining tools permits a wide variety of unexpected possibilities.

With the machining station there should preferably be associated an automatically operating loading and unloading device. In the present example of embodiment this device is of unusually strong construction. Storage arms for holding bars and unloading arms for receiving bars which have already been machined are situated on a machine frame, while between said arms conveyor rollers for conveying a bar into the machining station are disposed.

Storage arms and unloading arms usually extend at an angle to one another and are coated in order to cushion the reception of the bars. In addition, at least one ram cylinder is also associated with the storage arms, by means of which cylinder the bars fed to it are moved in the direction of a stop, from which they are then taken off singly. To ensure also in this case better order on the storage arms, holding-down means are provided which for example by means of hydraulically or pneumatically driven cylinders lower cross strips onto the bar ends, so that the latter cannot lie one over the other.

An important feature of the present invention consists however of extractor members which are disposed between the conveyor rollers and which are adapted to travel transversely to the conveying direction and also to be raised. Unmachined bars are taken off from the storage arms by means of these extractor members and laid on the conveyor rollers, and then machined bars are lifted off the conveyor rollers and in turn laid on the unloading arms. The extractor members are of such dimensions here that, when an extractor member is raised, two notches on their top face can cooperate both with an unmachined bar and at the same time also with a bar which has already been machined. The machined bars can thus be unloaded and at the same time a new bar laid on the conveyor rollers.

All the conveyor rollers, extractor members, storage arms and unloading arms, and of course also the appertaining cylinders and holding-down means should be vertically adjustable conjointly, so that the conveyor rollers can be brought to a desired height relative to an inlet opening or inlet channel at the machining station.

Feeding is not restricted just to round bars. If the centring jaws in the machining station and the conveyor rollers are changed, hexagonal, square and polygonal sections can be economically machined.

In a further stage of development of the invention a bar magazine is also associated with the loading and unloading device. Important elements of this bar magazine consist of rocker arms which are slidable in the direction of the loading and unloading device and which receive a plurality of bars. For this purpose each rocker arm consists of a U-shaped frame part having a base strip on which the bars lie, a rear support leg and a slide-up leg. With these slide-up legs there are associated lifting devices by means of which bars can be extracted from the magazine; when they are lifted, these bars slide along the slide-up surface, fall over an edge, roll on the top edge of the slide-up leg, and finally come to lie against a stop projection, which will be described further on.

In order to ensure that the bars always roll in the direction of the slide-up leg inside the frame part, according to the invention provision is made for an obliquely disposed conveyor strip to cross the frame part. The inclination of this conveyor strip can be adjusted as desired.

Each rocker arm or each frame part is guided in guides and preferably connected to a longitudinal beam, thereby permitting conjoint adjustability of all the rocker arms of a bar magazine. For the sake of simplicity the longitudinal beam is moved by means of a manual spindle drive, a plurality of rams carrying and also moving the longitudinal beam. In this connection other hydraulic or pneumatic and therefore automatic forms of adjustability are however also conceivable.

It is essential that the lifting device should have a lifting strip the outer edge of which extends at a variable distance from and approximately parallel to a slide-up surface on the slide-up leg. Through the movement of the rocker arm this distance is increased or reduced, so that the lifting strip can convey a different number of bars out of the bar magazine, or will convey only bars having a determined diameter.

In addition, each stop projection has associated with it a lever which is provided with an edge prong by means of which the bar is lifted from the slide-up leg and conveyed to the loading and unloading station. Said edge prong is in turn also at a certain distance from the stop projection, this distance being varied on movement of the rocker arm, to the same extent as the distance between the outer edge of the lifting strip and the slide-up surface. Thus this lever in turn also takes off a determined number of bars or only bars having determined diameters.

For these distance ratios to agree, the main frame of the bar magazine and the main frame of the loading and unloading station must be at an invariable distance from one another. Moreover, the lever arrangement provided with the edge prong is preferably connected to the loading and unloading station by means of corresponding pressure cylinders conjointly for the entire loading and unloading station.

BRIEF DESCRIPTION OF THE DRAWINGS

Other advantages, features and details of the invention will emerge from the following description of preferred examples of embodiment and with reference to the drawing, in which.

DETAILED DESCRIPTION

Figure 1:
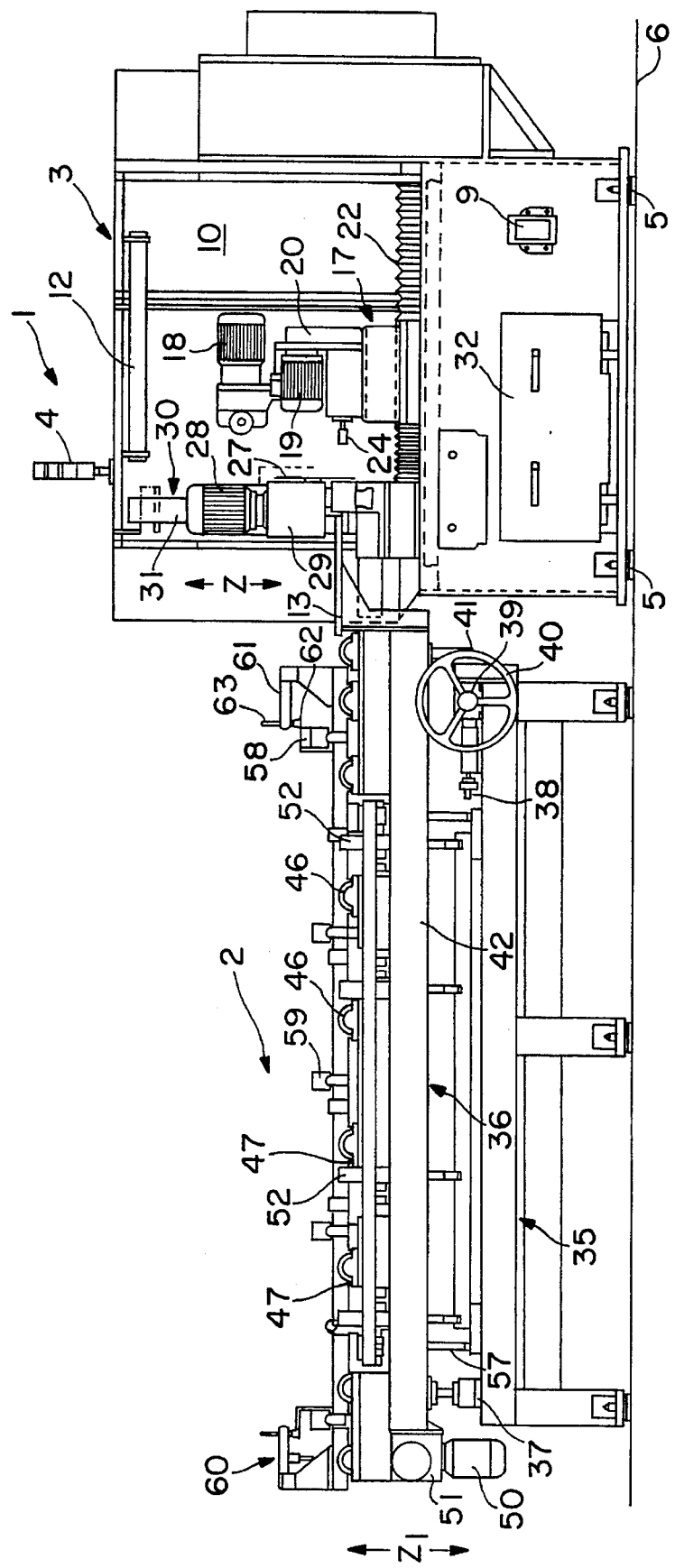
FIG. 1 is a side view of an apparatus according to the invention, particularly for machining the ends of bar material.
Figure 2:
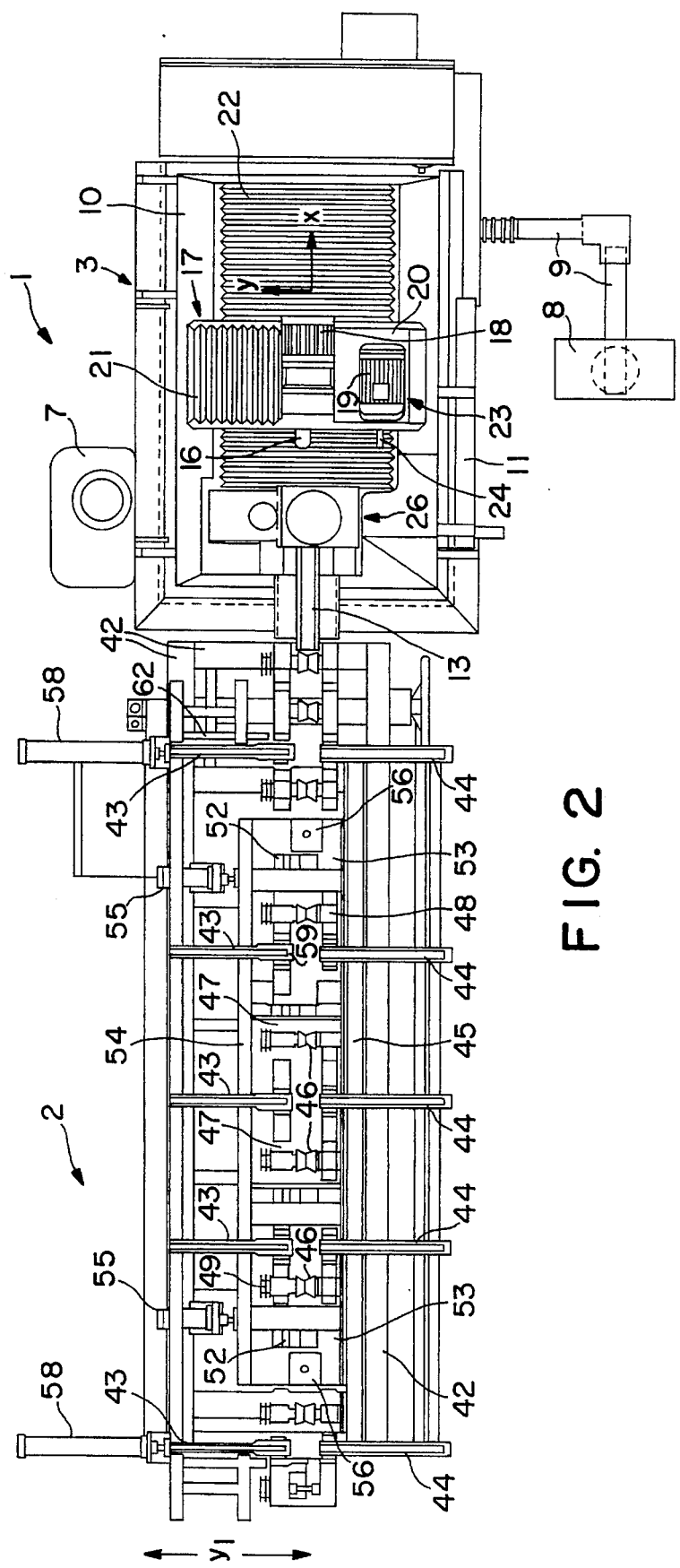
FIG. 2 is a plan view of the apparatus shown in FIG. 1.

An apparatus according to the invention, particularly for machining the ends of bar material, consists in accordance with FIGS. 1 and 2 of a machining station 1 and a loading and unloading device 2.

The machining station 1 has a casing 3, which is preferably closed on all sides. An operating status indicator 4 is mounted on the casing 3. In addition, the casing 3 is supported by means of appropriate feet 5 on, for example, a workshop floor 6.

As shown in FIG. 2, on one side of the casing 3 a tank 7 for an appropriate hydraulic supply for individual machining or holding devices is disposed, while on the other side an appropriate control desk 8 is connected by swivel arms 9 to the casing 3.

An interior space 10 of the casing 3 is accessible by opening a sliding door 11. In the present example of embodiment a sliding door 11 is provided only on one side, but a similar door may also be situated on the other side. An appropriate lighting device 12 supplies adequate light in the interior space 10. The sliding door 11 preferably has a window through which a working region of the interior space 10 is well visible.

For the purpose of feeding bar material (not shown in greater detail) into the interior space 10 of the machining station 1, an inlet channel 13 is provided which is directed towards the loading and unloading device 2 and ends in the interior space 10 near a vise 14. The bar material is held by clamp jaws 15 in said vise 14 (see FIG. 3). In addition, the vise 14 is in the form of a centering vise, cooperating with a positioning pin 16. This positioning pin 16 pushes the bar material into a desired end position before the clamp jaws 15 are closed.

The positioning pin 16 is fastened on a cross slide 17, which is adapted to travel in the x and y directions. The corresponding axial and transverse movements are made with the aid of a servomotor 18 and of recirculating cone [sic] screws (not shown in greater detail) connected to the servomotor 18 by means of appropriate gear units. The cross slide 17 is covered by an appropriate bellows 21 for protection against dirt, chips and cooling liquid.

A bellows 22 also covers a slide table (not shown).

At the side of the positioning station, indicated in particular by the positioning pin 16, a machining device 23 is provided on the cross slide 17. In this machining device 23 a chuck 24 is driven by a servomotor 19 with the aid of a suitable gear unit 20. Said chuck 24 serves to hold an appropriate tool by which the ends of the bar material can be machined. In this connection facing, internal beveling, external beveling, hollowing, form drilling, corner rounding, external cylindrical turning, spotfacing, flat punching, crowning, form turning, whirling, face milling or drilling are envisaged. If two different machining operations should be desired at the end of the bar material, it is possible to provide an additional machining device on the other side of the positioning pin 16.

A sawing unit 26 is also associated with the vise 14. In this arrangement a sawblade 27 crosses over the vise 14 and is driven by an electric motor 28 through a gear unit 29. The sawing unit 26 is also connected to a lifting device 30, for which an appropriate hydraulic cylinder 31 is used. By means of this lifting device 30 the sawing unit 26 can be raised and lowered in the direction Z. This arrangement therefore allows vertical infeed, the forces during sawing acting almost vertically directly on the bar material. Clean cuts with little chatter are thus achieved even with high-strength materials.

In the figures it is not shown in greater detail that the respective end machining point receives a coolant. In addition, appropriate collecting channels for the coolant and for the chips produced during the machining are not shown, although according to the invention the chips and the coolant can be discharged to an appropriate tray 32 via the collecting channels.

Figure 3:
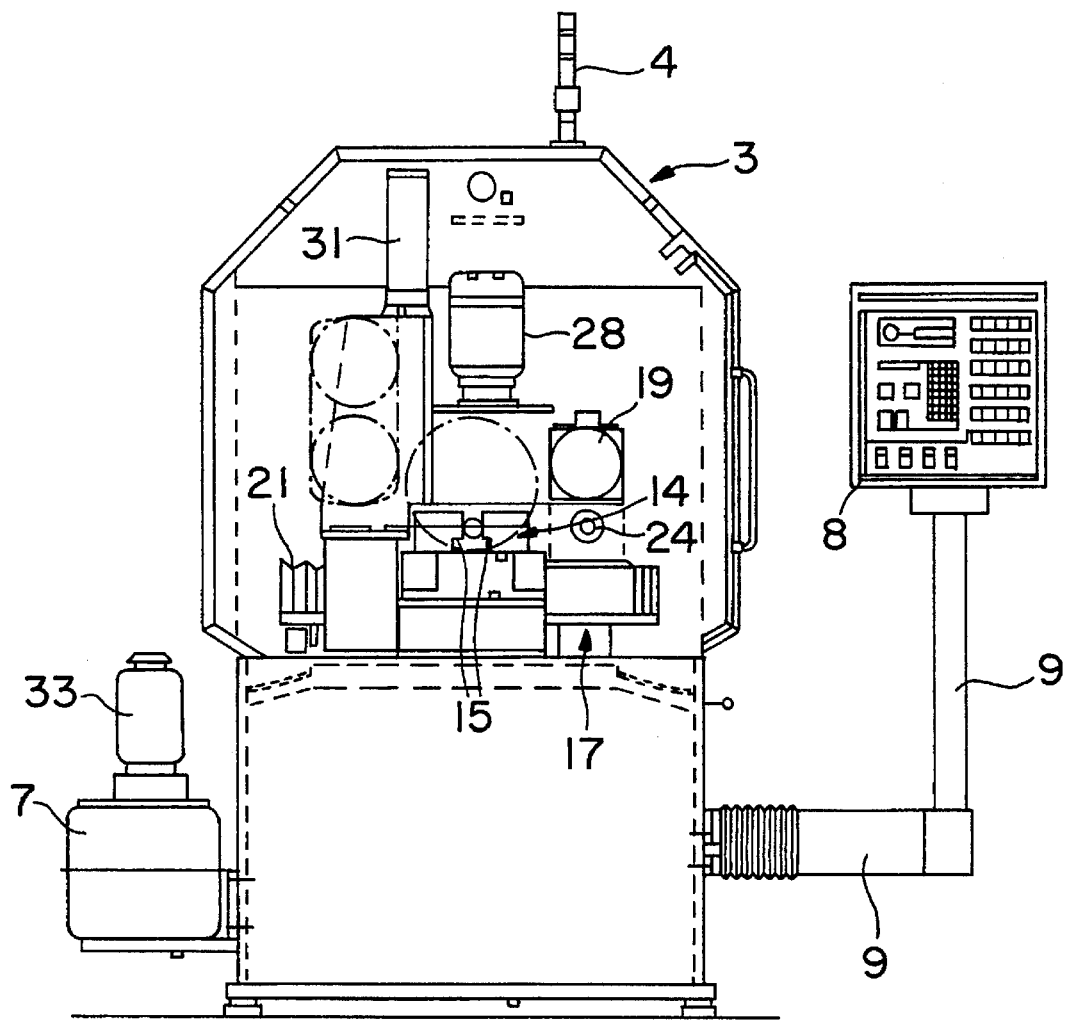
FIG. 3 is a side view of the inlet side of a machining station in the apparatus shown in FIG. 1.

In FIG. 3 it can also be seen that an appropriate hydraulic pump 33 is associated with the tank 7.

The loading and unloading station 2 has a sturdy machine frame 35. The actual table 36, which is vertically adjustable by means of four lifting members 37 disposed parallel to one another, is mounted on said machine frame 35. Only one of these lifting members 37 is shown in FIG. 1. The lifting members 37 are however connected by means of appropriate spindles 38 and gear units 39 to a handwheel 40, with the aid of which height adjustment in the direction Z1 of the table 36 is possible. The height adjustment is infinitely variable and can be read on a measuring device.

The lifting members 37 support a rectangular frame 42, which in the example of embodiment illustrated consists of appropriate hollow sections. Said frame 42 holds storage arms 43, directed towards the interior of the frame, and oppositely disposed unloading arms 44.

Both the unloading arms 44 and the storage arms 43 are in addition also connected together by a supporting sectional member 45, only one supporting sectional member 45 for the unloading arms 44 being shown in FIG. 2. In addition, at least the unloading arms 44 should be made adjustable in respect of their inclination, being provided, for example directly opposite the storage arms 43, with a pivot point about which the unloading arms 44 can be conjointly turned.

In addition, conveyor rollers 46, which are fastened to the frame 42 by means of appropriate bearing blocks 47, are provided between the frames 42. For this purpose these bearing blocks 47 are mounted on appropriate cross struts or the like.

Each conveyor roller 46 has an axle 48 passing through at least one bearing block 47. A drive wheel 49 is mounted at the other end of the axle 48 and is connected by means of a drive belt (not shown in greater detail) or the like to a drive 50. Said drive 50 is preferably in the form of an electric motor. An appropriate gear unit 51 is also provided. The drive wheels 49 may also be sprocket wheels driven by an appropriate chain. In this respect no limits should be imposed on the inventive principle. The conveyor rollers are preferably driven at two selectable speeds, and in addition the direction of rotation can be changed.

Moreover, extractor members 52 spaced apart from one another are disposed between individual conveyor rollers 46. The extractor members 52 are mounted on support plates 53 which are connected together on both sides by means of a longitudinal frame 54. This longitudinal frame 54 is acted on by hydraulic cylinders 55, so that the extractor members 52 are slidable in the direction y1.

In addition, lifting cylinders 56 are associated with the extractor members 52, and with their aid the extractor members 52 can be raised in the direction of the stored bar material. The lifting cylinders 56 or a corresponding piston rod 57 is pivotally connected to the frame 42.

The bar material laid on the storage arms 43 is pressed by means of ram cylinders 58 against a stop 59 and held in that position. For the purpose of holding down the bar material on the storage arms 43, holding-down means 60 are disposed on both sides of the loading and unloading device 2. Said holding-down means consist for the sake of simplicity of a cross strip 62 which is fastened on a gallows 61 and which can be lowered downwards by means of hydraulic or pneumatic cylinders 63.

The mode of operation of the present invention is as follows:

The loading and unloading device 2 is first aligned relative to the machining station 1, that is to say the conveyor rollers 46 are brought into line with the inlet channel 13.

Bar material, which may consist of round or polygonal sections and which is to be machined, is then laid on the storage arms 43, and said bar material is pressed by means of the ram cylinders 58 against the stops 59. With the exception of the first section or sections, the bar material is held down by the cross strips 62 to ensure that a certain order is achieved.

The extractor members 52 are then moved in the direction y1, to be specific by means of the hydraulic cylinders 55. The extractor members 52 are thereupon raised by means of the lifting cylinders 56, so that a first bar comes to lie in a first notch in the extractor member 52. The extractor members 52 are then moved back in the direction y1 and lowered so that the bar lies in the conveyor rollers 46. Said conveyor rollers 46 are rotated, so that the bar is delivered into the inlet channel 13 until its end strikes against the positioning pin 16. The position of the bar is corrected by moving the positioning pin 16.

If for example an end is then to be cut off straight, the sawing unit 26 is lowered. The vise 14 is opened again and the position of the bar is corrected with the aid of the positioning pin 16 and of the moving conveyor rollers 46.

The machining device 23 is thereupon moved in the direction y into the machining position and the end of the bar is machined, the depth of penetration of a tool into the end of the bar being for example determined by means of the cross slide 17.

As soon as the machining has been completed, the conveyor rollers 46 are rotated in the opposite direction, so that the bar is pulled out of the machining station 1. Appropriate limit switches (not shown in greater detail) indicate when the bar has reached its end position.

The extractor members 52 are now raised, so that the bar which has already been machined is received in a second notch in the extractor member 52. The dimensions of the extractor member 52 are such that at the same time the next bar to be machined can be taken from the storage arms 43. On a further movement of the extractor members 52 in the direction y1, the bar which has already been machined is brought above the unloading arms 44 and the bar which has still to be machined is brought over the conveyor rollers 46. On the lowering of the extractor members 52 the bar which has already been machined is then laid on the unloading arms 44 and the bar which has still to be machined is laid on the conveyor rollers 46.

This operation is then continuously repeated. Automatic feeding of the machining station 1 is thereby achieved.

All the working operations are controlled from the control desk 8 for the machining station and also from another control desk for the loading and unloading device.

Figure 4:
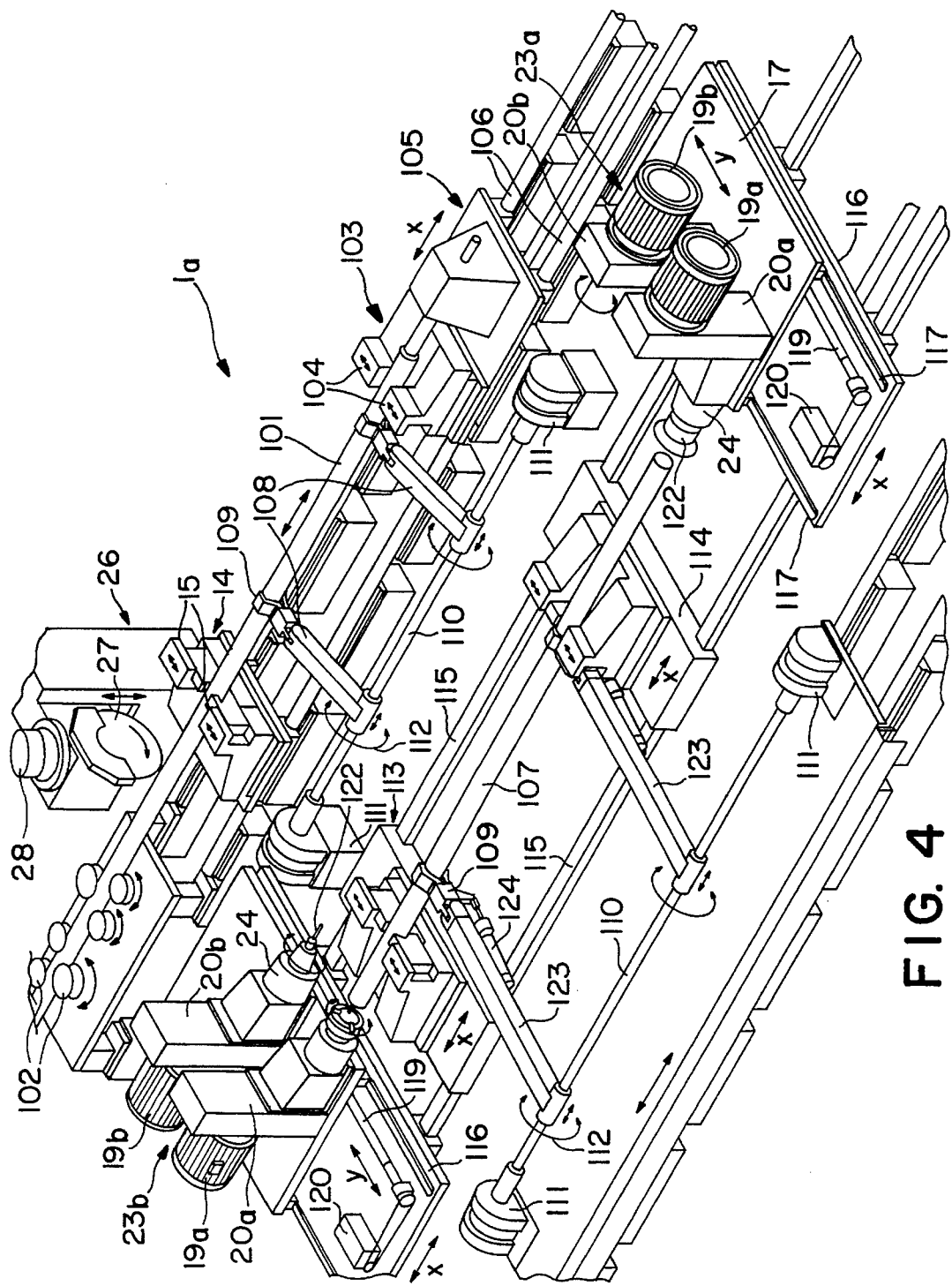
FIG. 4 is a view in perspective of another example of embodiment of a machining station.

In another example of embodiment of a machining station 1a, as shown in FIG. 4, individual machining steps are carried out separately of one another, and in particular the machining of both ends of a bar 101 is possible. This bar 101 is introduced by means of driven driving rollers 102 into the machining station 1a, passing through under the sawblade 27 of the sawing unit 26 and also being guided through the vise 14.

In this example of embodiment another vise 103 is provided opposite the vise 14, the jaws 104 of said vise 103 being adapted to hold and clamp the bar 101.

The vise is followed by an indexing unit 105, which is adapted to travel in the direction x. For this purpose the indexing unit 105 is mounted on guide rods 106. With the aid of the indexing unit 105 the length of a bar portion is determined, and this length is then separated from the bar 101 by means of the sawing unit 26. After a bar portion 107 has been cut off, it is taken up by grippers 108, which have an appropriate gripper mouth 109. At the other end of the gripper mouth 109 the grippers 108 are connected fixedly in terms of rotation with a shaft 110, the latter being mounted in two bearings 111. A shaft drive (not shown in greater detail) can turn the shaft 110 so that the grippers 108 are pivoted in the direction of the double arrows 112. After the clamp jaws 104 or 15 have been opened, the bar portion 107 is thereby pivoted out of its first machining position and brought into a second machining position, as also indicated in FIG. 4.

In this second machining position the bar portion 107 is held by two vises 113 and 114 spaced apart from one another and adapted to travel on guide columns 115. The operation can once again be carried out in the direction x. The bar portion 107 is fastened in such a manner that both its ends project out of the respective vise 113, 114 and can be machined.

This machining is achieved with the aid of a machining device 23a and of a second machining device 23b. For the sake of simplicity each machining device 23a, 23b is likewise mounted on the guide columns 115 beyond the respective vise 113, 114, an appropriate slide table 116 likewise being adapted to travel in the direction x.

Guide rails 117 serving to guide a cross table 118 are disposed on the slide table 116. The cross slide 17 is moved with the aid of a driven spindle 119, which passes through an internally threaded sleeve (not shown in greater detail) on the underside of the cross table 118, so that the latter is adapted to travel in the direction indicated by the double arrow y. The spindle 119 is driven by means of a motor 120 and a drive belt 121.

In the example of embodiment shown in FIG. 4, two servomotors 19a and 19b can be seen on each cross slide 17, these servomotors driving clamp jaws 24 for tools 122 by means of appropriate gear units 20a and 20b. With the aid of these tools the bar portion 107 can be machined simultaneously at both ends.

It is obvious that it is also possible for a plurality of such servomotors together with a plurality of corresponding driven tools also to be provided on a cross slide 17. In addition, it is also envisaged to dispose a plurality of vises 113 and 114 respectively side by side, each of them holding a bar portion, this plurality of bar portions lying side by side then being simultaneously correspondingly machined by the tools 122. In this respect no limits should be set on the building block principle of the present invention. In this way the machining of separate bar portions, or else of a plurality of bar portions, can be carried out simultaneously. In one practical example of embodiment a total of 16 NC axes were provided.

In connection with control it must be pointed out that each motor and drive is freely programmable. This means very considerable flexibility for the machining of bar ends. Any wish expressed by customers can be met.

In an example of embodiment not illustrated in greater detail the cross slide also carries a machining unit driving a tool which is movable in the lifting direction Z. This machining unit then crosses over the corresponding bar portion. For example, transverse bores can thus be formed in the bar portion.

In this selected form of construction of a machining device la it would be advisable only in very rare cases for machined bar portions 107 to be taken up again by the grippers 108 and to be guided back by means of the driver rollers 102 to the loading and unloading station, although this possibility is also to be included in the principle of the present invention. However, for the continuous machining of the bar portions 107, further grippers 123 are associated with the vises 113 and 114, these grippers being of similar construction to the grippers 108. A pressure medium cylinder 124 is shown for each of these grippers 123 to enable the gripper mouth 109 to be operated. The gripper 123 is mounted and driven in the same way as the grippers 108, for which reason no further description will be given, while the same reference numerals are used for like elements. After the grippers 123 have been pivoted outwards, the machined bar portion 107 is then deposited on a stand (not shown in greater detail).

Figure 5:
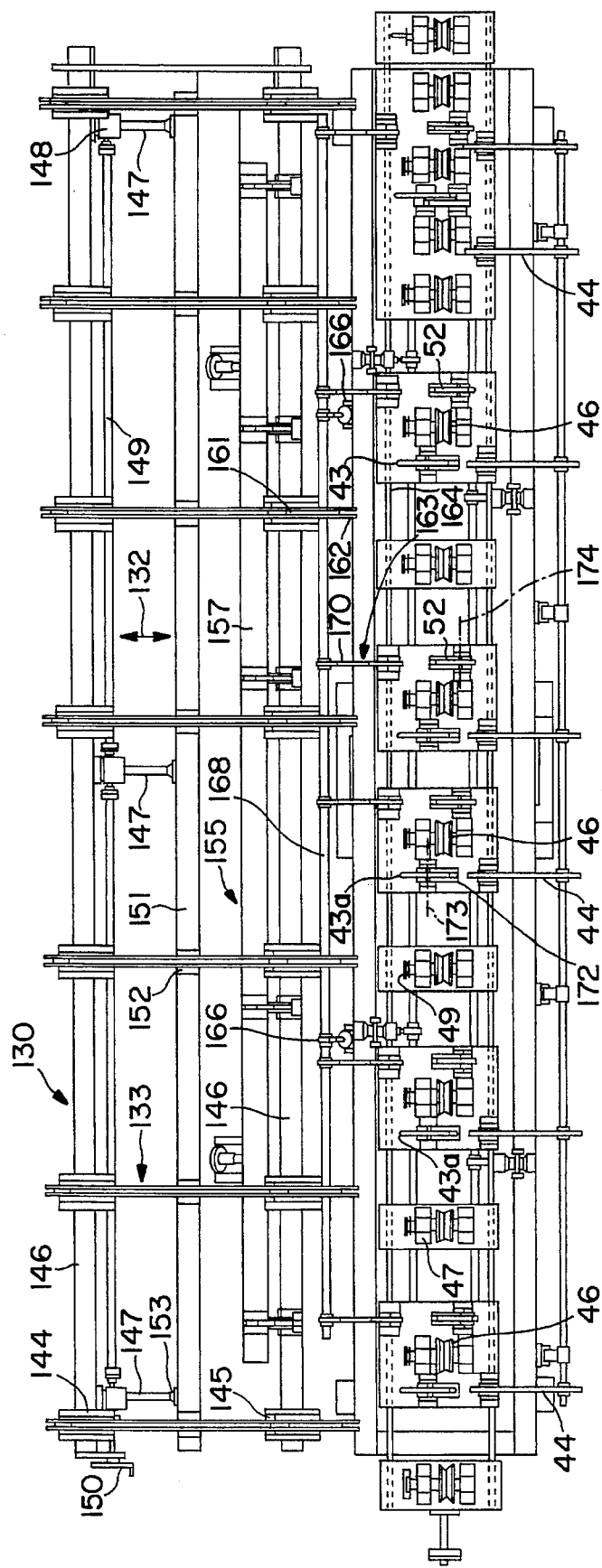
FIG. 5 is a plan view of another example of embodiment of a loading and unloading device with a bar magazine.
Figure 6:
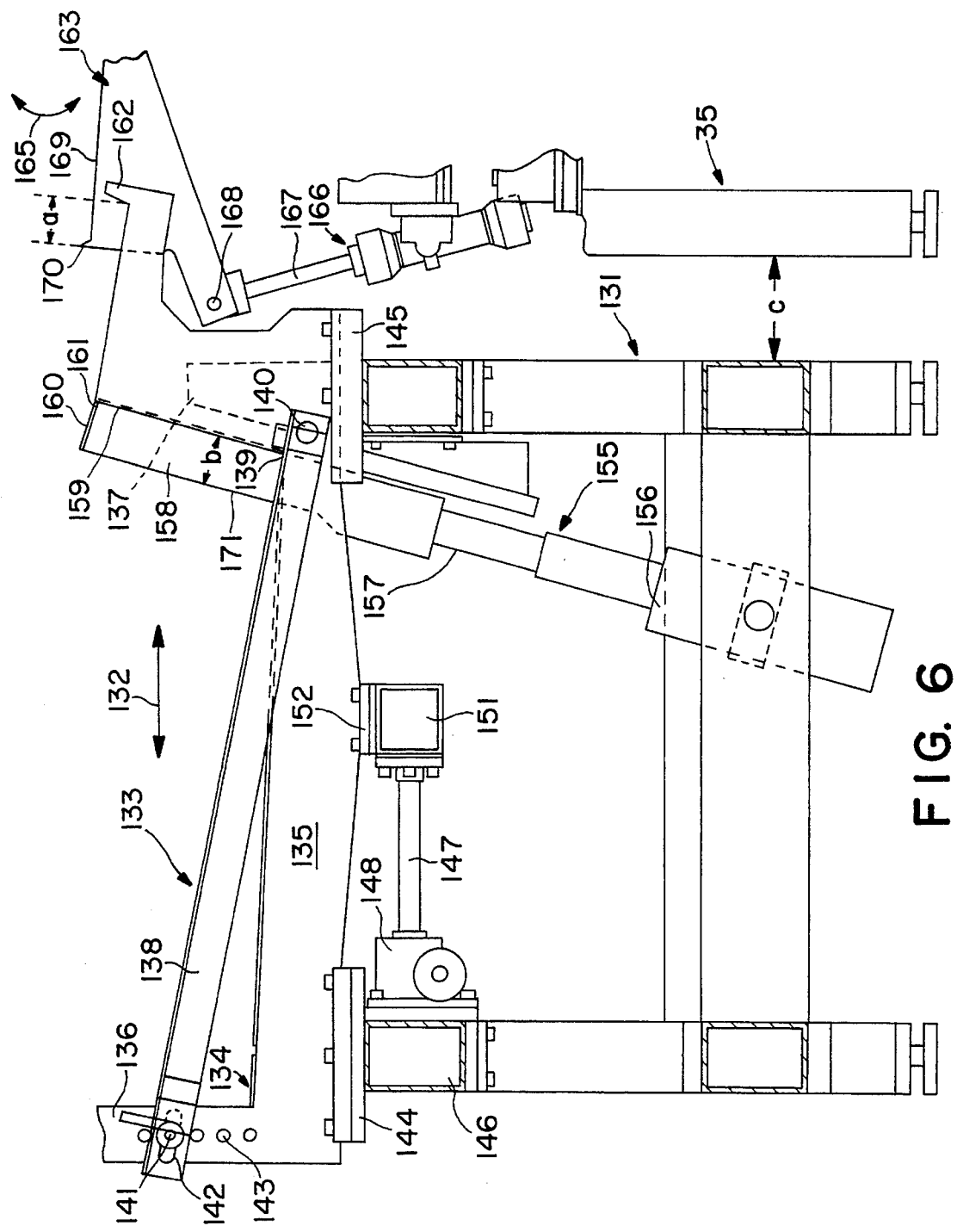
FIG. 6 is an end view of the bar magazine shown in FIG. 5.

FIGS. 5 and 6 illustrate another example of embodiment of a loading and unloading device 2a. Associated with this loading and unloading device 2a, according to FIGS. 5 and 6, is also a bar magazine 130, which serves in particular to separate individual bars and to convey bars of different diameters.

Rocker arms 133, which are slidable in the direction of the double arrow 132, are situated on a main frame 131, which can be seen in particular in FIG. 6 and which will not be described in further detail. Each rocker arm 133 consists of a U-shaped frame part 134 comprising a base strip 135, a support leg 136 and an obliquely inclined slide-up leg 137. This U-shaped frame part 134 serves to receive bars (not shown in greater detail).

A conveyor strip 138, which can be obliquely inclined as desired, ensures that bars situated in the frame part 134 can always roll to a conveying corner 139. This conveyor strip 138 is therefore pivotally connected to the slide-up leg 137 by means of a pivot pin 114, while at the other end it can be adjusted by means of an appropriate socket pin 141 passing through a slot 142 in the conveyor strip 138 and through various bores 143 in the support leg 136.

The rocker arms 133 are mounted astride guide plates 144 and 145, and the latter are mounted on cross bearers 146 of the main frame 131. At the same time they are mounted in slots (not shown in greater detail) for sliding in the direction of the double arrow 132 between said guide plates 144 and 145.

The sliding of the rocker arms 133 in the direction of the double arrow 132 is brought about by three rams 147, which by means of miter gear unit 148 and corresponding connection rods 149 are connected to one another or to a handwheel 150. The miter gear unit 148 is so designed that the rams 147 are movable in the direction of the double arrow 132, thereby moving a longitudinal beam 151. The rocker arms 133 are fastened to said longitudinal beam 151 by means of a mounting plate 152.

The rams 147 may also be in the form of threaded spindles, which then pass through corresponding threaded sleeves 153.

A lifting device 155 is associated with the slide-up legs 137 and serves to lift out a bundle of bars, while a corresponding lifting cylinder 156 is connected to a lifting beam 157 extending in the longitudinal direction. Lifting strips 158 project upwards from said lifting beam 157 between individual rocker arms 133 and extend approximately parallel to a slide-up surface 159 on the slide-up leg 137. By means of this lifting strip 58 [sic], or of an end edge 160 of the latter, bars lying in the conveying corner 139 are conveyed along the slide-up surface 159 until they roll over an edge 161 of the slide-up leg 137 and roll to a stop projection 162.

From this position near the stop projection 162 the bars are lifted out by means of a lever 163 which is pivoted on a stationary rod 164 and turns about the latter. It turns in the direction of the double arrow 165. This turning is effected with the aid of a pressure cylinder 166 whose piston rod 167 is pivotably connected to the lever 163 at the end remote from the rod 164. In order that only two pressure cylinders 166 will be needed, the individual levers, which also engage between the rocker arms 133, are joined together by means of a longitudinal shaft 168.

In addition, the bars are prevented from slipping off a slide surface 169 on the lever 163 by means of an edge prong 170.

It can be seen clearly from FIG. 6 that the distance a between the stop projection 162 and the edge prong 170 varies to the same extent as the distance b between the slide-up surface 159 and an outer edge 151 of the lifting strip 158. The variation of both the distance a and the distance b is brought about by the sliding of the rocker arm 133 in the direction of the double arrow 132. It can by this means be determined how many bars are taken out of the magazine by the lifting strip. Furthermore, bars may be taken out in accordance with predetermined bar diameters. For this purpose the distance c between the machine frame 35 and the main frame 131 remains the same. The pressure cylinder 166 is in addition situated on the machine frame 35.

After the levers 163 have taken one or more bars from the slide-up leg 137, these bars roll along the slide surface 169 after a determined rotation of the lever 163, and are transferred direct to the storage arms 43. The storage arms 43 also have here a stop prong 172 which is roughly disposed in such a manner that a bar is situated directly above the conveyor rollers 46. Through the lowering of the storage arms 43a on rotation about a pivot pin 173 the bar is laid on the conveyor rollers 46.

If bar portions are to be brought back and laid on unloading arms 44, this is achieved with the aid of the extractor members 52, which also turn about their pivot pins 174. It is obvious that the pivot pins 173 all the storage arms 43 and the pivot pin 174 all the extractor members 52 [sic] are connected together and can also be operated conjointly.

I claim:

1. An apparatus for machining an end of bar stock comprising: a machining device; means for positioning the bar stock along a longitudinal axis such that the end of the bar stock is positioned at a desired location with respect to the machining device; means for holding the bar stock end in position at said desired location relative to the machining device; positioning means for moving said machining device in (1) a first direction (X) toward and away from said end of bar stock and parallel to said longitudinal axis, (2) a second direction (Z) above and below said end of bar stock and perpendicular to said longitudinal axis, and (3) a third direction (Y) transversing said end of bar stock and perpendicular to said first direction (X) and said second direction (Z).

2. An apparatus according to claim 1 wherein the machining device is disposed on a slide.

3. An apparatus according to claim 2 wherein the slide is mounted on a slide table.

4. An apparatus according to claim 1 wherein a second machining device is disposed at the other end of the bar stock.

5. An apparatus according to claim 2 wherein the means for holding is at least one vise.

6. An apparatus according to claim 5 wherein the machining device and the vise are disposed on guide means.

7. An apparatus according to claim 5 wherein at least one gripper is associated with the vise for removing bar stock.

8. An apparatus according to claim 6 wherein positioning means is associated with the vise.

9. An apparatus according to claim 8 wherein the positioning means comprises an indexing unit disposed at a side of the machining device and is slidably mounted on the guide means.

10. An apparatus according to claim 9 wherein gripper means are associated with the vise and the indexing unit for transferring the bar stock from a first working position between the vise and the indexing unit to a second working position near the machining device.

11. An apparatus according to claim 5 wherein a sawing unit is associated with the vise and is connected to a lifting device.

\* \* \* \* \*